Figure 1A:
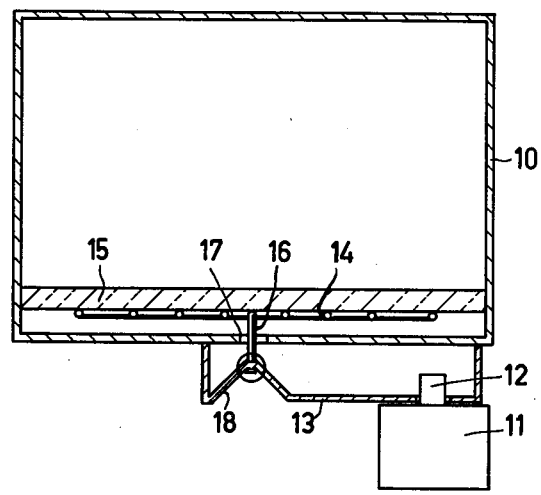

United States Patent [19]

Carlsson et al.

[11] 4,197,442
[45] Apr. 8, 1980

[54] TEMPERATURE SUPERVISING SYSTEM

[75] Inventors: Kurt H. Carlsson; Bengt T. L. Lindström, both of Norrköping, Sweden

[73] Assignee: U.S. Philips Corporation, New York, N.Y.

[21] Appl. No.: 876,901

[22] Filed: Feb. 13, 1978

[30] Foreign Application Priority Data

Feb. 10, 1977 [SE] Sweden .............................. 7701487

[51] Int. Cl.[2] ............................................. H05B 9/06
[52] U.S. Cl. ............................... 219/10.55 B; 307/310
[58] Field of Search .................. 219/10.55 B, 10.55 C; 307/310, 358

[56] References Cited

U.S. PATENT DOCUMENTS

| | | | |
|---|---|---|---|
| 3,662,140 | 5/1972 | Jones et al. | 219/10.55 B |
| 3,670,134 | 6/1972 | Bucksbaum | 219/10.55 B |
| 3,820,068 | 6/1974 | McMillin | 307/358 |
| 4,109,129 | 8/1978 | Satoh et al. | 219/10.55 B |

Primary Examiner—Bruce A. Reynolds
Assistant Examiner—Keith E. George
Attorney, Agent, or Firm—Thomas A. Briody; William J. Streeter; Bernard Franzblau

[57] ABSTRACT

A temperature supervising system comprising a temperature sensor which is designed to sense the temperature of the supervised component and to supply a signal representing the temperature, which signal is compared with a reference signal to produce an alarm or to interrupt the connection of the component to a supply source when the difference between the signal indicating the temperature and the reference signal exceeds a given value, for example zero. The reference signal is generated by a function generator which supplies a signal varying with time, which signal, in a period immediately after the instant the component is connected to its current source, increases according to any desired function, for example stepwise or linearly, from a low initial value to a higher output value.

12 Claims, 10 Drawing Figures

TEMPERATURE SUPERVISING SYSTEM

The invention relates to a system for supervising the temperature of an electric component which is supplied by a supply source which can be switched on and off. The system comprises a temperature sensing device having a temperature sensor which is coupled mechanically to the component to be supervised and which supplies an output voltage varying with the temperature of the supervised component. A comparison device receives the output voltage and a reference voltage derived from a reference voltage source and supplies an output signal when the output voltage exceeds the reference voltage. This output signal may be used as a switching signal for switching off the voltage source and/or as an alarm signal.

Temperature supervising systems of the above mentioned kind are known and have for their object to protect the component from damage which may occur when the temperature of the component increases to a higher value than the maximum permissible temperature determined by a reference voltage of constant value.

In practice, however, such a temperature supervising system has not proved reliable in all circumstances. Accurate investigations have demonstrated that this is the result of the inertia inherent in the system and is caused mainly by the temperature sensor which is coupled mechanically to the component to be supervised.

It is an object of the invention to provide a temperature supervising system of the kind described in the preamble which is distinguished by a higher degree of reliability.

According to the invention, such a temperature supervising system is characterized in that the reference voltage source is constituted by a function generator which is always started at the instant at which the supply source is switched on and which, from that instant on, supplies a reference voltage which varies in time from a given initial value to a final value which is reached after a given period of time and which is decisive of the maximum permissible temperature of the component to be supervised.

The system according to the invention may be used for supervising an electrical component, for example, a transformer, in which a defect, for example a short circuit, causes an abnormal rise in temperature. In this type of application, the maximum permissible temperature of the component to be supervised and hence the final value of the reference voltage may be comparatively low since the temperature of the component in normal operating conditions does not reach a high value.

However, the system according to the invention is especially suitable for supervising components the temperature of which in normal operating conditions increases, immediately after switching on the supply source, from a low initial value to a considerably higher permissible temperature value in a given period of time. This is the case, for example, in a microwave oven.

Therefore, the system according to the invention is particularly suitable for use in a microwave oven so as to protect it from damage which may occur when the microwave source is switched on while no energy-absorbing charge is present in the oven space. In this abnormal operating condition certain parts of the microwave oven, immediately after switching on the microwave energy source, are heated considerably more strongly by the then occurring reflected microwave energy in a short period of time. The system according to the invention is coupled to such a component and supplies an output signal which may be used to automatically switch off the microwave energy supply at an early stage immediately after it is switched on so that damage to the oven is prevented.

The variation in time of the value of the reference voltage which is supplied by the function generator should correspond approximately to the voltage in a normal operating situation dependent on the rise in temperature of the supervised oven part but should be slightly higher than the voltage representing the actual temperature in the component so that in this normal condition no alarm and/or switching off of the supply source takes place. The refence voltage which is supplied by the function generator may have, for example, a stepwise variation or may increase according to a continuous function, for example linearly. By a suitable choice of the initial value and the function according to which the reference voltage rises to the final value, a timely switching off of the supply source can be obtained in the case of an abnormal situation.

In the case in which the voltage source of the component is repeatedly switched off, for example in the case of successive work cycles, the initial temperature of the component may vary. In order to compensate for such a varying initial temperature and to provide a correct initial value of the reference voltage, means may be provided which, at the instant at which the supply source is switched on, automatically adjust the initial value of the reference voltage to a value which is in a given fixed relationship to the voltage supplied at that instant by the temperature sensing device.

Figure 1B:
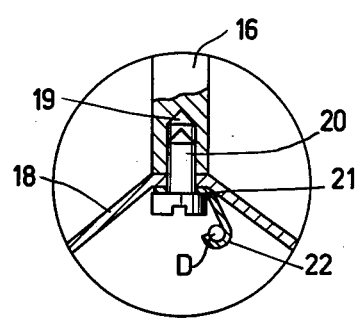
Figure 2:
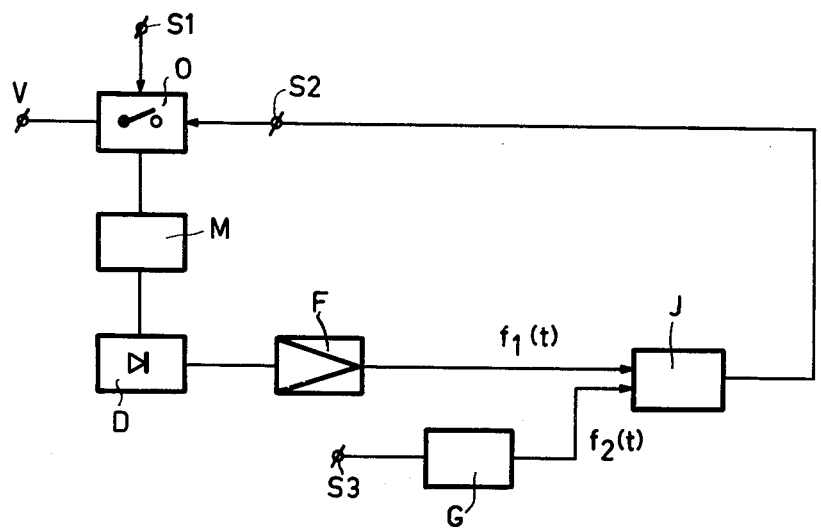
Figure 3:
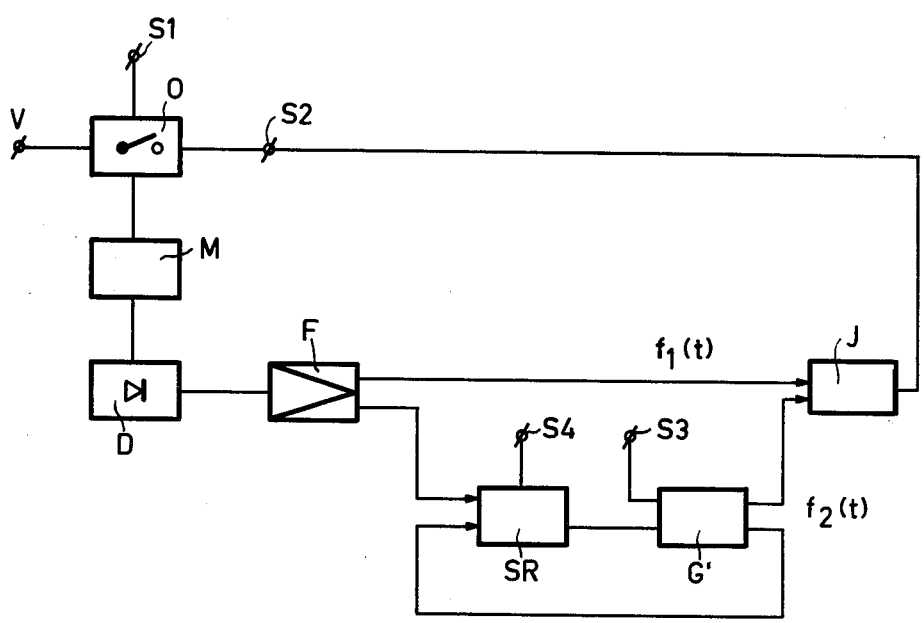
Figure 4:
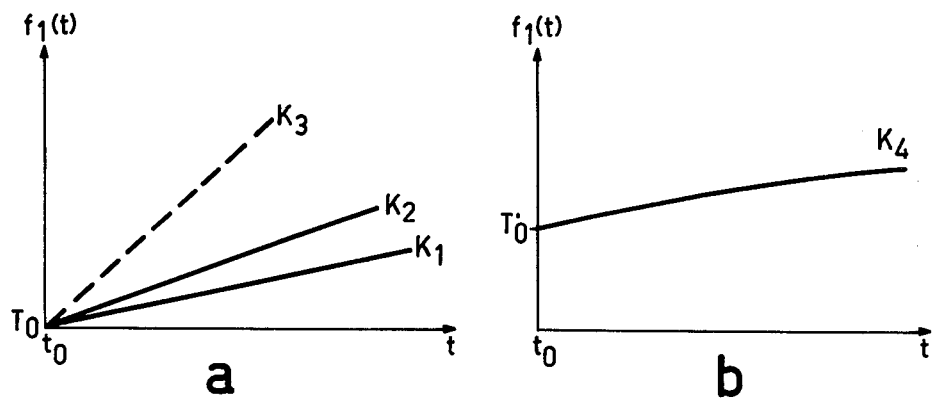
Figure 4:
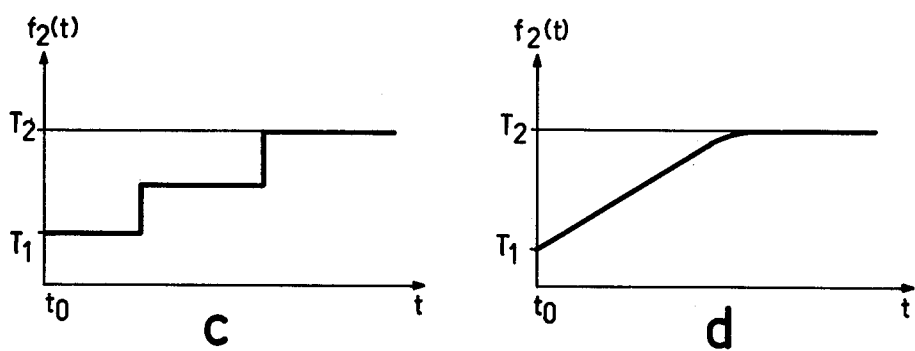
Figure 4:
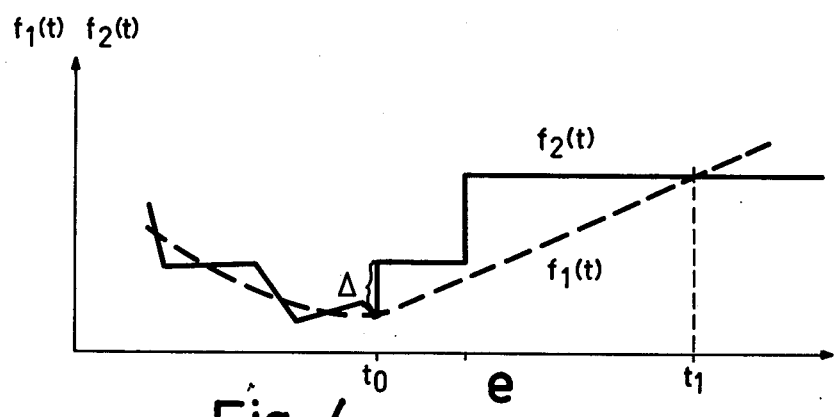
Figure 5:
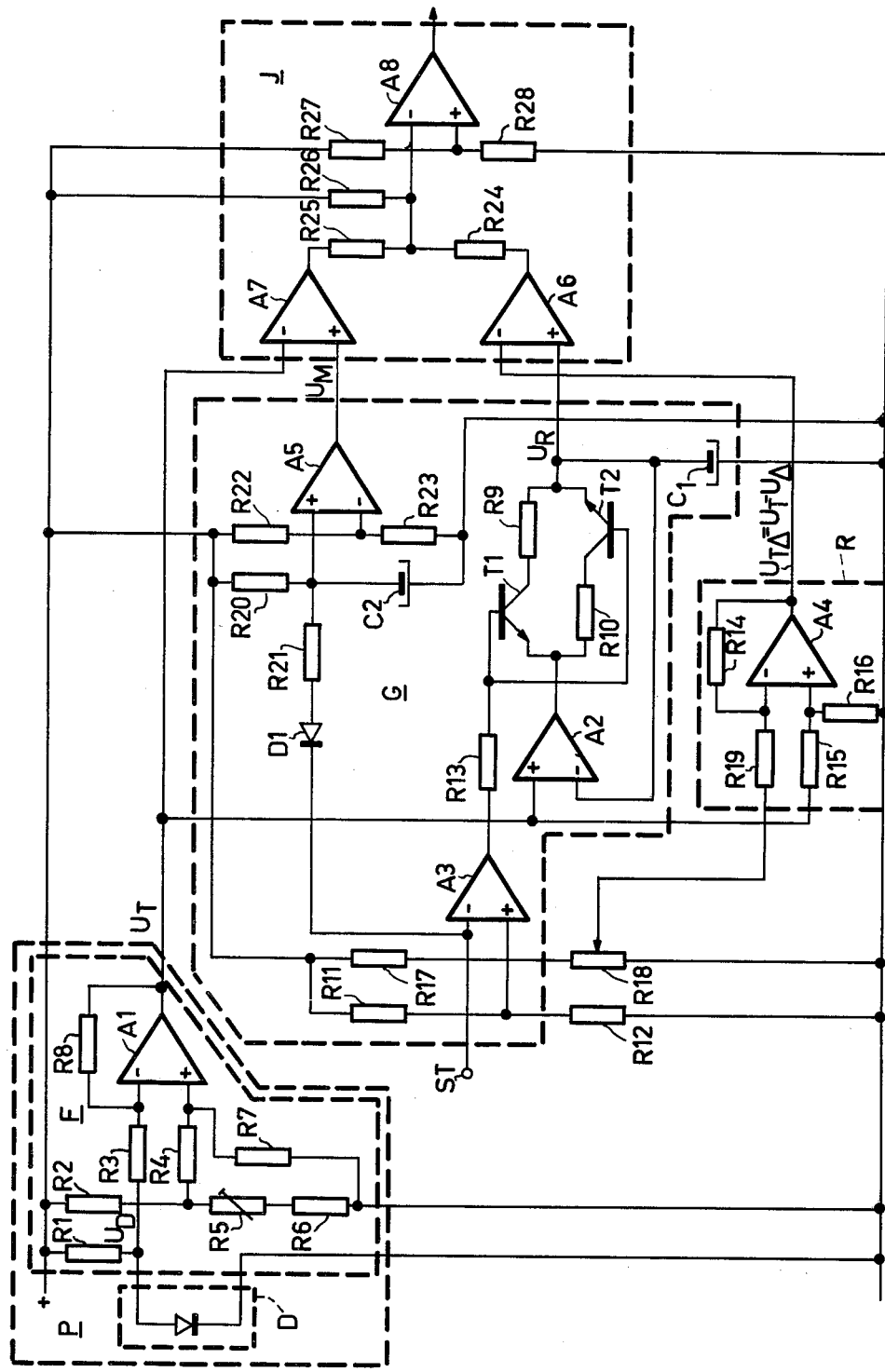

The invention will be described in greater detail with reference to the accompanying drawing in which:

FIG. 1a is a diagrammatic sectional view of a microwave oven,

FIG. 1b shows a detail of FIG. 1a with a temperature sensor which is incorporated in the temperature supervising system according to the invention, FIG. 2 shows a block diagram of a temperature supervising system according to the invention, FIG. 3 shows the corresponding block diagram of a temperature supervising system to which a servo loop has been added for the automatic adjustment of the initial value of the reference voltage, FIGS. 4a, 4b, 4c, 4d and 4e show several time diagrams to explain the operation of the system according to the invention, and FIG. 5 shows a complete diagram of a temperature supervising system according to the invention.

Reference numeral 10 in FIG. 1a denotes an oven cavity, 11 is a magnetron having a coupling-out antenna 12, and 13 denotes a wave guide which is adapted to guide the microwave energy of the magnetron to a coupling-out system provided in the oven cavity. In the oven shown, said coupling-out system is in the form as is described in greater detail in U.S. Appln. Ser. No. 739,976 (filed Nov. 8, 1976), now U.S. Pat. No. 4,165,454, and comprises a system of conductors 14 provided below a support platform 15. The system of conductors has a central supply point where a metal pin 16 projecting from the system of conductors extends through an aperture 17 in the bottom plate of the oven cavity into the wave guide. Opposite the aperture 17 in the bottom plate of the oven cavity and the metal pin 16, a supply cone 18 is provided with which the metal pin 16 is in galvanic contact.

FIG. 1b shows on an enlarged scale the connection point between the metal pin 16 and the conical part 18 of the wave guide. The end of the pin facing the metal cone has a screw-threaded hole 19 in which a bolt 20 is screwed. Between the end face of the cone and the head of the bolt a ring 21 is clamped comprising a holder 22 for a diode D. The metal pin 16, the end face of the metal cone 18, the bolt 20 and the ring 21 constitute a good heat conductor and the diode D senses the temperature of the metal pin 16. The diode D constitutes the temperature sensor in a supervising system according to the invention which protects the microwave oven from damage caused by too high a temperature which may occur when the oven is switched on in the unloaded condition.

FIG. 2 shows a block diagram of a temperature supervising system according to the invention. In FIG. 2, a temperature sensor which may be formed by the diode D of FIG. 1b is represented by the block D and the microwave oven shown in FIG. 1a the temperature of which is to be supervised is represented by the block M. The microwave energy source of the oven is denoted by V and said source V can be switched on and off by means of a switching unit O. The energy source is switched on when a start signal is supplied to terminal S1. When a signal is applied to terminal S2 the supply of energy to the component M is interrupted. The temperature sensor D provides a voltage which depends on the temperature of the oven M and which is amplified in an amplifier F and is then applied to an input of a comparison device J. The sensor D and the amplifier F together constitute a temperature sensing device the output signal $f_1(t)$ of which is applied to the comparison device. A signal $f_2(t)$ which is derived from a function generator G is applied to a second input of the comparison device J. The function generator is started by supplying a start signal to a terminal S3. The start signal is simultaneously applied to the terminals S1 and S3 so that the function generator starts at the same instant at which the supervised component M is connected to its supply source. The signal $f_1(t)$ supplied by the temperature sensing device is compared in the comparison device J with the reference signal $f_2(t)$ of the function generator and for simplicity it is assumed that the comparison device J supplies an output signal when $f_2(t)$ exceeds $f_1(t)$ whereas, in the opposite case, no voltage is obtained from the comparison device. The output voltage of the comparison device is applied to terminal S2 of the switching unit O and ensures that the voltage source is switched off.

The uppermost diagram of FIG. 4 shows a few examples of specific shapes of the output signal $f_1(t)$ of the temperature sensing device as a function of the time t after the switching-on instant $t_0$. The curves $k_1$ and $k_2$ of the diagram of FIG. 4a represent the rise in temperature of the sensed point for two different charges in the oven starting from an initial value $T_0$, which corresponds to a normal room temperature. The curve $k_3$ represents the unloaded oven heating characteristic, i.e. the rise in temperature of the supervised point when the oven space is empty, also starting from a normal room temperature.

Curve $k_4$ in the diagram of FIG. 4b represents the rise in temperature of the supervised point when the oven is started with an increased temperature $T_0'$ at the instant $t_0$ at which the supply source is switched on. The temperature conditions represented by the curves $k_1$, $k_2$ and $k_4$ should not result in the supply source being switched off, whereas the changes in the temperature which are represented by the curve $k_3$ must result in a switching-off of the supply source.

The diagrams of FIGS. 4c and 4d show two examples of how the reference signal $f_2(t)$ of the function generator G in FIG. 2 can vary in time after the starting instant $t_0$. In agreement with the diagram shown in FIG. 4c the reference signal varies stepwise from an initial value $T_1$ via two steps upwards to a final value $T_2$. According to the diagram shown in FIG. 4d the reference signal increases linearly from the initial value $T_1$ at the starting instant $t_0$ to the final value $T_2$. In both cases the initial value corresponds to a temperature which is slightly higher than the actual temperature of the supervised point at the starting instant so as to prevent undesired switching off of the supply source. The final value of the reference signal corresponds to the maximum temperature admissible at the supervised point.

FIG. 3 shows an extension of the device shown in FIG. 2 which provides a compensation for different initial temperatures. Shown in FIG. 3 are the supervised component M, the switching unit O with terminals S1 and S2, the temperature sensor D, the amplifier T and the comparison device J. Shown in addition is the function generator G' but this generator has two outputs. As in the system of FIG. 2, a first input is connected to a start terminal S3, while a first output is connected to the comparison device J. As shown in FIG. 3, there is also a servo control circuit SR which has two inputs which are connected at one end to a second output of the amplifier F at which the output signal $f_1(t)$ appears which varies with the temperature of the temperature sensing device, and at the other end to a second output of the function generator G' at which the output signal $f_2(t)$ appears. The output of the servo control circuit SR is connected to a second input of the function generator G'. The servo control circuit SR also has a control input which is connected to a terminal S4.

The function generator G' and the servo control circuit SR constitute a closed control loop which is operative as long as the voltage source is not switched on. The operation consists in that the output signal $f_2(t)$ of the function generator is compared with the output signal $f_1(t)$ of the amplifier F at the input of the servo control circuit SR. Any deviation between the two signals at the input of the servo control circuit results in an error signal which controls the function generator G' in a manner such that the deviation is controlled to zero. In this manner the output signal $f_2(t)$ is made equal to the output signal $f_1(t)$ so that the reference signal $f_2(t)$ is kept equal to the output signal $f_1(t)$ of the temperature sensing device during the time preceding the switching on of the supply source. At the same instant at which a start signal is applied to the switching unit O so as to switch on the voltage source and a start signal is applied to terminal S3 so as to start the function generator G', a stop signal is applied to the terminal S4 so that the servo control circuit is deactuated. At the said instant the function generator begins to supply its given output signal varying in time starting from an initial value which depends on the temperature condition prevailing at the start and represented by the value of $f_1(t)$.

The function is shown in FIG. 4e, in which the solid line represents the reference signal $f_2(t)$ of the function generator and the broken line indicates the output signal $f_1(t)$ of the amplifier F varying with the temperature. It is assumed that the supervised component is cooled in the time between two successive work cycles so that the curve $f_1(t)$ is falling in the period prior to the time $t_o$. In said cooling period the curve $f_2(t)$ follows the curve $f_1(t)$ with a given periodic build-up of deviations as is shown in FIG. 4e on an exaggerated scale. At the start instant $t_0$ the supply source is switched on and the control in the closed loop is interrupted. At the instant $t_0$ the function generator starts to supply its previously determined output function, which in the given example means that the signal increases stepwise by a given value $\Delta$ so as to avoid undesired switching off of the supply source. The output signal of the function generator then is constant for a certain period of time, after which a stepwise increase of the signal to the final value occurs. In the same period of time the temperature of the supervised point increases, as is indicated by the broken line curve. In the given example the curves $f_2(t)$ and $f_1(t)$ intersect each other at the instant $t_1$, so that the supply source is switched off.

FIG. 5 shows an embodiment in which the function generator supplies a reference voltage which, immediately after switching on, has a first voltage value for a certain period of time and then assumes a second higher value corresponding to the said final value. The temperature sensing device is denoted by P in this figure and comprises a temperature sensor D formed by a diode and an amplifier F. As shown in FIG. 5, the temperature sensor diode D is biased in its forward direction via a resistor R1. The forward voltage drop $U_D$ is a measure of the temperature of the diode and varies, for example, by approximately 2 mV/°C. In order to obtain a voltage variation which is as large as possible, the signal $U_D$ is applied, via a resistor R3, to the minus (inverting) input of an operational amplifier A1 which is fed back via a resistor R8. A fixed reference voltage generated by a voltage divider R2, R5, R6 is applied via a resistor R4 to the other input of the amplifier A1. The components A1 and R2–R8 situated within the block drawn by a dashed line constitute the amplifier F. The output voltage $U_T$ of said amplifier is a measure of the temperature of the supervised point and increases by, for example, 30 mV/°C. The voltages $U_T$ is applied on the one hand to a voltage generator R and on the other hand to the function generator G and the comparison device J.

The function generator G consists of a difference amplifier A2 to the plus (non-inverting) input of which is applied the said temperature-dependent voltage $U_T$ and to the minus (inverting) input of which is applied the voltage which appears across a capacitor C1. The charge condition of the capacitor C1 is determined by two parallel current branches connected to the output of the amplifier A2 and comprising transistors T1 and T2 respectively, and resistors R9 and R10, respectively. The bias voltage for the base electrodes of the transistors T1 and T2 is obtained from the output of an amplifier A3 which operates as an inverter. A start signal is applied, via a start terminal St, to the minus input of the amplifier A3, while the plus input receives a fixed voltage which is derived from a voltage divider R11, R12. The start voltage at terminal St is zero in the period prior to starting the microwave oven and becomes approximately +5 V when the oven is started. The output voltage of A3 is the inverted voltage at St and is therefore +5 V prior to starting and 0 V at the instant of starting. In the said first period, the so-called "stand by" conditions, the amplifier A3 provides a positive voltage which is applied to the base of the transistors T1 and T2 via a resistor R13 and as a result one of the transistors T1 or T2 is kept in the conductive condition. Which of the transistors T1 and T2 is conductive depends on the output voltage of the amplifier A2 relative to the voltage across capacitor C1. The amplifier A2 provides a positive voltage, for example 5 V, when the voltage at the plus input is higher than the voltage at the minus input. This condition occurs if the temperature-dependent voltage $U_T$ of amplifier A2 is higher than the voltage across the capacitor C1. If the voltage at the minus input is higher than the voltage at the plus input, the amplifier A2 supplies the voltage O. This occurs when $U_T$ is lower than the voltage across capacitor C1. In the former case the capacitor C1 is charged via the transistor T2; in the latter case the capacitor C1 is discharged via the transistor T1. As long as the inverter A3 supplies a positive voltage, that is in "stand by" condition, the capacitor C1 is therefore always kept at a voltage which is always equal to $U_T$ by alternate charging and discharging. When the inverter A3 provides the voltage zero, the two transistors T1 and T2 are brought into the non-conductive state and the voltage $U_R$ of the capacitor C1 then remains constant. The capacitor voltage $U_R$ is applied to the comparison device J to serve as a reference signal during a first period of time immediately after starting the oven. In this period the reference voltage $U_R$ is constant and equal to the value which $U_T$ had at the starting instant.

The voltage generator R comprises an operational amplifier A4 which is fed back via a resistor R14. The temperature-dependent voltage $U_T$ is applied to the plus input of the amplifier A4 via a voltage divider circuit R15, R16. A fixed voltage $U_\Delta$, which is derived from a voltage divider circuit R17, R18 is applied to the minus input of amplifier A4 via an input resistor R19. The resistors R14–R19 are proportioned so that the output voltage of the amplifier A4 is equal to $U_{T\Delta} = U_T - U_\Delta$. The voltage $U_\Delta$ is adjusted so as to correspond to the rise in temperature, for example of a value of 7°, which takes place during a given period of time, for example 30 seconds, during operation with an empty oven. $U_{T\Delta}$ hence follows $U_T$ but is always a fixed quantity smaller than $U_T$. The voltage $U_{T\Delta}$ is applied to the comparison device J to serve as a temperature indication signal during a first period after starting the oven.

The function generator G further comprises a difference amplifier A5, which is controlled by a time circuit comprising a capacitor C2. The capacitor C2 is charged via a resistor R20 and is discharged via a resistor R21 and a diode D1, which are connected to the start terminal St. The voltage across the capacitor C2 is applied to the plus input of the amplifier A5, while a voltage which is derived from a voltage divider R22, R23 is applied to the minus input. The amplifier A5 supplies the output voltage O when the voltage at its plus input is smaller than the voltage at its minus input. When the voltage at the plus input is equal to or higher than the voltage at the minus input, amplifier A5 supplies a given maximum voltage which represents the maximum admissible temperature. In the "stand by" condition, that is prior to starting the magnetron, the start terminal St, as indicated above, has a voltage zero. The capacitor C2 is then always kept in the charged condition via R21 and D1 because the resistance value of R21 is much smaller than that of R20. When the magnetron is started the voltage at the start terminal St increases to a positive value, for example +5 V. The diode D1 is then brought to the non-conductive condition and charging of C2 via R20 is started. As long as the capacitor voltage is lower than the voltage at the minus input, the output voltage of amplifier A5 is equal to zero. When the capacitor voltage is equal to the voltage at the minus input, the output voltage of amplifier A5 increases to a maximum value which is then maintained. The output voltage $U_M$ of amplifier A5 is applied to the comparison device J to serve as a reference voltage after a period of time which is determined by the time circuit C2, R20. The voltage $U_M$ is chosen to correspond to the maximum temperature which the supervised point in the oven may assume.

In principle the comparison device J consists of two input amplifiers A6, A7 and an output amplifier A8. All amplifiers supply a high output voltage when the plus input receives a higher voltage than the minus input. In all other cases they supply a low output voltage, for example zero. The first amplifier A6 receives at its plus input the voltage $U_R$ which occurs across capacitor C1. As already stated, said voltage, in the period prior to starting the oven, follows the voltage $U_T$ which indicates the temperature and said voltage, after starting the oven, is locked at the value which $U_T$ had at the instant of starting. At its minus input the amplifier A6 receives the difference voltage $U_{T\Delta} = U_T - U_\Delta$ which represents the sensed temperature reduced by a fixed quantity.

The second input amplifier A7 receives at its plus input the said voltage $U_M$ of amplifier A5 controlled by the time circuit C2, R20, which voltage, after starting, increases to a high value in a given period of time, for example 30 seconds. At its minus input the amplifier A7 receives the output voltage $U_T$ of the amplifier F which is representative of the temperature.

The two input amplifiers A6 and A7 are each connected with their outputs via resistors R23 and R25 to the minus input of an output amplifier A8. Said minus input is also connected to the positive terminal of a supply source via a resistor R26. Amplifier A8 receives at its plus input a fixed voltage which is derived from a voltage divider R27, R28. The resistors R24–R28 are proportioned so that the voltage at the minus input of the output amplifier A8 is higher than the voltage at the plus input and the output voltage of amplifier A8 hence is low if one of the amplifiers A6, A7 supplies a high output voltage. Only when the two amplifiers A6, A7 supply a low voltage will the voltage at the minus input of the amplifier A8 be lower than the voltage at the plus input so that the output voltage becomes high.

The switching from a low voltage to a high voltage at the output of amplifier A8 initiates the interruption of the operation of the magnetron of the oven.

The operation of the whole circuit is as follows:

In a period prior to starting the oven, in the so-called "stand-by" condition, supply voltage is supplied to the circuit shown in FIG. 5, but the magnetron is not operating. The voltage at the start terminal St is zero and the capacitor C2 is kept in the discharged condition via D1, R21. The voltage $U_R$ across C1 follows the voltage $U_T$ while the output voltage $U_M$ of amplifier A5 is zero. The output voltage of the amplifier A6 is high and that of amplifier A7 is low so that the output voltage of amplifier A8 is kept low. When the oven is started by switching on the magnetron, the voltage at the start terminal St is approximately +5 V. The diode D1 is cut off so that the charging of the capacitor C2 begins and the voltage $U_R$ across C1 is simultaneously locked at the value which the temperature-dependent voltage $U_T$ had at the instant of starting. In the period immediately after starting the output voltage $U_M$ of amplifier A5 is still low, as is the output voltage of amplifier A7, whereas the output voltage of amplifier A6 is high. The output voltage of the output amplifier A8 is low. Normally this condition will last while the capacitor C2 has a lower voltage than the voltage applied to the minus input of amplifier A5. This period may be, for example, approximately 30 seconds. If during this period the voltage $U_{T\Delta}$ should increase more than the original difference $U_\Delta$ between the voltages $U_R$ and $U_T$, the output voltage of amplifier A6 becomes low. The two amplifiers A6 and A7 then have a low output voltage and the output voltage of amplifier A8 becomes high. The oven is switched off. This occurs when the temperature at the sensed point and hence the temperature-dependent voltage $U_T$ increases by more than $U_\Delta$ during the first 30 seconds, for example corresponding to 7° C.

If during this period the switching off does not occur, the voltage $U_M$ will become high after approximately 30 seconds and hence the output voltage of amplifier A7 also becomes high. The temperature at the sensed point and hence the voltages $U_T$ and $U_{T\Delta}$ increase continuously. After the oven has been in operation for some time, the output voltage of amplifier A6 becomes low as a result of the fact that the voltage $U_T$ at the minus input becomes higher than the locked voltage $U_R$ occurring at the plus input of amplifier A6. The output voltage of amplifier A8, however, is kept low because the output voltage of amplifier A7 now is high. Normally this condition lasts until the operating cycle is completed and the oven is switched off by the normally available time mechanism which controls the duration of the work cycle. However, should the temperature of the sensed point exceed the maximum permissible temperature before the work cycle has been completed, the output voltage of amplifier A7 becomes low and the output voltage of amplifier A8 becomes high. The magnetron is then switched off automatically before the work cycle has been completed.

What is claimed is:

1. A system for supervising the temperature of a microwave oven energized by a voltage supply source which can be switched on to energize the oven and off to protect the system from damage in the event the oven is energized in an unloaded condition, said system comprising, a temperature sensing device including a temperature sensor coupled mechanically to a component of the oven to be supervised and which supplies an output voltage which varies with the temperature of the component supervised, a comparison device having first and second inputs coupled to receive said output voltage and a reference voltage respectively and which supplies an output signal when the output voltage exceeds the reference voltage, and a reference voltage source comprising a function generator started at the instant at which the supply source is switched on so as to supply a reference voltage independent of the mass of any material to be heated in the oven and which varies in time from a given initial value to a final value reached after a given period of time and which determines the maximum permissible temperature of the oven component supervised.

2. A system as claimed in claim 1 further comprising switching means coupling the supply source to a microwave energy source for the oven, and means coupling the output signal of the comparison device to the switching means so as to switch off the supply source.

3. A system as claimed in claim 1 wherein the function generator produces a reference voltage that increases continuously from an initial value to a final value according to a linear function.

4. A system as claimed in claim 1 wherein the function generator includes means for generating a reference voltage determined by the unloaded oven heating characteristic.

5. A system for monitoring the temperature of an electric component supplied by a voltage supply source which can be switched on and off comprising, a temperature sensing device including a temperature sensor coupled mechanically to the monitored component so as to supply an output voltage which varies with the temperature of said component, a comparison device having first and second inputs and an output, a reference voltage source comprising a function generator which is started when the voltage supply source is switched on and which, from that instant on, supplies a reference voltage which varies in time from a given initial value to a final value reached after a given period of time and which determines the maximum permissible temperature of the monitored component, means coupling said output voltage and said reference voltage to the first and second inputs, respectively, of the comparison device which produces an output signal when the output voltage exceeds the reference voltage, and a device coupled to the function generator for automatically adjusting the initial value of the reference voltage to a value which is in a given fixed relationship to the value of the output voltage of the temperature sensing device at the instant at which the voltage supply source is switched on.

6. A system as claimed in claim 5 wherein the automatic adjusting device comprises a servo control circuit connected in cascade between an output of the temperature sensing device and an input of the function generator and a feedback circuit coupling an output of the function generator to an input of the servo control circuit, and means for deactivating the servo control circuit when the function generator is activated.

7. A system for monitoring the temperature of an electric component supplied by a voltage supply source which can be switched on and off comprising, a temperature sensing device including a temperature sensor coupled mechanically to the monitored component so as to supply an output voltage which varies with the temperature of said component, a comparison device having first and second inputs and an output, a reference voltage source comprising a function generator which is started when the voltage supply source is switched on and which, from that instant on, supplies a reference voltage which varies in time from a given initial value to a final value reached after a given period of time and which determines the maximum permissible temperature of the monitored component, means coupling said output voltage and said reference voltage to the first and second inputs, respectively, of the comparison device which produces an output signal when the output voltage exceeds the reference voltage, and wherein the function generator produces a reference voltage that has a step-like variation with at least one stepwise increase of the reference voltage of a first value to the final value occurring a given period of time after the instant at which the supply source is switched on.

8. A system as claimed in claim 7 wherein the function generator comprises a first voltage generator which supplies a first output voltage $U_R$ the value of which is equal to the temperature-dependent output voltage $U_T$ of the temperature sensing device at the instant of switching on, and a second voltage generator having a time circuit which causes said second voltage generator to supply a second output voltage $U_M$ a certain period of time after the instant of switching on, the value of which corresponds to the said final value, and wherein the said first and second generator output voltages are supplied to the comparison device as a reference voltage.

9. A system as claimed in claim 8 wherein the system further comprises a third voltage generator which supplies an output voltage $U_{T\Delta}$ the value of which is equal to the temperature-dependent output voltage $U_T$ of the temperature sensing device reduced by a fixed voltage value $U_\Delta$, the comparison device comprising a first difference amplifier in which the output voltage $U_R$ of the first voltage generator is compared with the output voltage $U_{T\Delta}$ of the third voltage generator, a second difference amplifier in which the temperature-dependent output voltage $U_T$ of the temperature-sensing device is compared with the output voltage $U_M$ of the said second voltage generator, and a third difference amplifier coupled to outputs of the said first and second difference amplifiers and which supplies an output voltage only when the output voltage of the first and the second difference amplifiers are both low.

10. A system for monitoring the temperature of an electric component supplied by a voltage supply source which can be switched on and off comprising, a temperature sensing device including a temperature sensor coupled mechanically to the monitored component so as to supply an output voltage which varies with the temperature of said component, a comparison device having first and second inputs and an output, a reference voltage source comprising a function generator which is started when the voltage supply source is switched on and which, from that instant on, supplies a reference voltage which varies in time from a given initial value to a final value reached after a given period of time and which determines the maximum permissible temperature of the monitored component, means coupling said output voltage and said reference voltage to the first and second inputs, respectively, of the comparison device which produces an output signal when the output voltage exceeds the reference voltage, and wherein the function generator immediately after switching on produces a first voltage valve during a given period of time and then produces a second higher value corresponding to the said final value.

11. A system as claimed in claim 5, 7 or 10 wherein the system monitors the temperature of a microwave oven so as to protect the oven from damage by superheating of certain components as a result of switching on a microwave source in an unloaded condition.

12. A system for monitoring the temperature of a microwave oven comprising, a high frequency energy generator, switching means coupling the high frequency generator to a source of supply voltage, a temperature sensing device coupled to the oven so as to derive an output voltage that varies with the oven temperature, a reference voltage source comprising a function generator energized in synchronism with the high frequency generator so as to generate a reference voltage that varies with time in accordance with a given function, a first comparison device having input means coupled to receive said output voltage and said reference voltage and an output coupled to the switching means to control the operation thereof when the output voltage and the reference voltage attain a predetermined relationship, a second comparison device having a first input coupled to an output of the temperature sensing device, a second input coupled to an output of the function generator and an output coupled to an input of the function generator so that the second comparison device and the function generator form a closed loop control circuit, and means for deactivating said closed loop control circuit when the high frequency generator is coupled to the source of supply voltage.

* * * * *